(12) United States Patent
Biss et al.

(10) Patent No.: US 6,451,944 B2
(45) Date of Patent: Sep. 17, 2002

(54) CONTINUOUS, SOLVENT-FREE PROCESS FOR MAKING COPOLYMERS OF MALEIC ANHYDRIDE AND $C_{1-4}$ ALKYL VINYL ETHER

(75) Inventors: Russell Biss, Wayne; Jeffrey Cohen, Fair Lawn; John Zamora, Paramus; Krystyna Plochocka, Scotch Plains; Jeffrey A. Lynn, West Milford, all of NJ (US)

(73) Assignee: ISP Investments Inc., Wilmington, DE (US)

( * ) Notice: Subject to any disclaimer, the term of this patent is extended or adjusted under 35 U.S.C. 154(b) by 0 days.

(21) Appl. No.: 09/861,044

(22) Filed: May 18, 2001

Related U.S. Application Data

(63) Continuation-in-part of application No. 09/596,297, filed on Jun. 15, 2000, now abandoned.

(51) Int. Cl.[7] ............................................... C08F 34/02
(52) U.S. Cl. ................................... 526/271; 526/68
(58) Field of Search ..................................... 526/271, 68

(56) References Cited

U.S. PATENT DOCUMENTS 5,034,488 A * 7/1991 Tazi et al. ................. 526/271
5,874,510 A * 2/1999 Kwak et al. ................ 526/271

\* cited by examiner

*Primary Examiner*—David W. Wu
*Assistant Examiner*—William Cheung
(74) *Attorney, Agent, or Firm*—Walter Katz; William J. Davis; Marilyn J. Maue

(57) ABSTRACT

A continuous, solvent-free process for obtaining solvent-free, fine white powders of high molecular weight alternating copolymers of maleic anhydride and a $C_1-C_4$ alkyl vinyl ether, without odor or taste, having the molecular structure $(A—B)_n$, where A is maleic anhydride, B is an alkyl vinyl ether and n is an integer indicative of the molecular weight of the copolymer, which comprises feeding alkyl vinyl ether as reactant and solvent in excess over the desired 1:1 mole ratio of A:B in the copolymer, molten maleic anhydride and a free radical initiator, continuously at predetermined feeding rates into a reactor heated at a reaction temperature of about 50° to 100° C., charging the reactor and withdrawing reaction product, residual alkyl vinyl ether and initiator from the reactor at the same rate as the feed rate of reactants into the reactor simultaneously thereby maintaining a constant volume in the reactor, stripping residual alkyl vinyl ether from the reaction product, drying the copolymer obtained of any remaining traces of alkyl vinyl ether, and recycling recovered alkyl vinyl ether back into reactor as reactant and solvent.

5 Claims, 1 Drawing Sheet

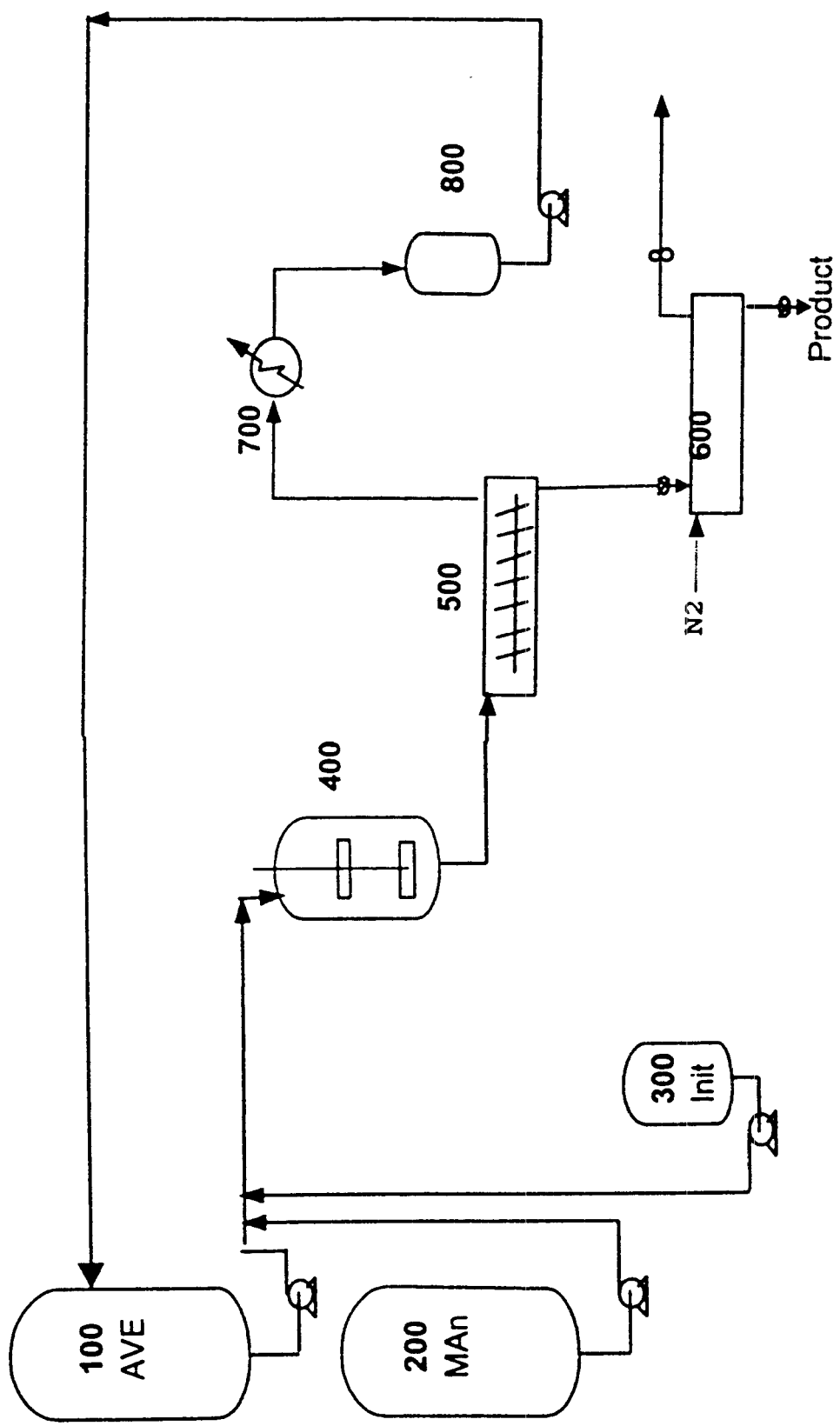

CONTINUOUS, SOLVENT-FREE PROCESS FOR MAKING COPOLYMERS OF MALEIC ANHYDRIDE AND $C_{1-4}$ ALKYL VINYL ETHER

CROSS REFERENCE TO RELATED PATENT APPLICATION

This application is a continuation-in-part of pending U.S. patent application Ser. No. 09/596,297, filed Jun. 15, 2000, now abandoned.

DESCRIPTION OF RELATED U.S. PATENTS

This invention is related to U.S. Pat. Nos. 5,959,053 and 5,939,506 assigned to the same assignee as herein.

BACKGROUND OF THE INVENTION

1. Field of the Invention

This invention relates to copolymers of maleic anhydride and a $C_1$–$C_4$ alkyl vinyl ether, and, more particularly, to a continuous, solvent-free process for making solvent-free, fine white powders of such copolymers having advantageous properties useful for oral care compositions.

2. Description of the Prior Art

A batch, solvent-free process (i.e. no solvent other than reactants themselves) for making fine powders of high molecular alternating copolymers of maleic anhydride (MAN) and a $C_1$–$C_4$ alkyl vinyl ether (AVE) having a molecular structure of $(A-B)_n$ where A=MAN, B=AVE and n is an integer which is indicative of its molecular weight, is described in U.S. Pat. Nos. 5,959,053 and 5,939,506. In such process, excess AVE monomer is present over a 1:1 molar ratio of monomers, to function both as reactant and solvent in the system. No other solvent is present in the reactor. Accordingly, after stripping the excess AVE from the reaction product, a solvent-free copolymer is obtained. However, a batch process requires an extended amount of time to effect the reaction, usually necessitating about 9–13 hours to complete each batch.

Accordingly, it is an object of this invention to provide a continuous, solvent-free process for making solvent-free, fine white powders of copolymers of MAN and AVE having advantageous properties useful for oral care compositions.

SUMMARY OF THE INVENTION

What is described herein is a continuous, solvent-free process for obtaining solvent-free, fine white powders of high molecular weight alternating copolymers of maleic anhydride and a $C_1$–$C_4$ alkyl vinyl ether, without odor or taste, having the molecular structure $(A-B)_n$, where A is maleic anhydride, B is an alkyl vinyl ether, and n is an integer indicative of the molecular weight of the copolymer. The process herein comprises feeding continuously alkyl vinyl ether as monomer reactant and solvent in excess of the desired 1:1 mole ratio of A:B in the copolymer, molten maleic anhydride and a free radical initiator, at predetermined feeding rates, into a reactor heated at a reaction temperature of about 50° to 100° C., charging the reactor and withdrawing reaction product, residual alkyl vinyl ether and initiator from the reactor at the same rate as the feed rate of reactants into the reactor simultaneously thereby maintaining a constant volume in the reactor, stripping residual alkyl vinyl ether from the reaction product, drying the copolymer obtained of any remaining traces of alkyl vinyl ether, and recycling recovered alkyl vinyl ether back into reactor.

In the preferred embodiments of the continuous solvent-free process of the invention, the alkyl vinyl ether is methyl vinyl ether, the mole ratio of methyl vinyl ether to molten maleic anhydride is about 25:1 to 5:1, most preferably 12:1 to 7:1. The initiator concentration is 0.01 to 0.2% based on the weight of copolymer, and the % copolymer solids removed from the polymerization reactor is about 10 to 40%.

BRIEF DESCRIPTION OF THE DRAWINGS

Then, the next FIGURE shows a schematic drawing of the inventive continuous process for obtaining a solvent-free, fine white powders of high molecular weight alternating copolymers of alkyl vinyl ether and maleic anhydride.

DETAILED DESCRIPTION OF THE INVENTION

Referring now to the FIGURE, which is a schematic drawing for making solvent-free copolymers of maleic anhydride (MAN) and $C_{1-4}$ alkyl vinyl ethers (AVE) by a continuous, solvent-free process. The continuous solvent-free process of the invention consists of the solvent feed system 100, the molten maleic anhydride feed system 200, the catalyst or initiator feed system 300, the reactor system 400, the product recovery and drier systems 500 and 600, and the solvent recovery system 700 and 800.

The average residence time* of the monomers in the reactor system should be sufficient to completely react MAN, e.g. from 0.5 to 5 hours. To ensure complete reaction of MAN, higher temperature and/or initiator booster can be used at the end of reaction zone. The specific viscosity (SV) of the copolymer is controlled by adding a chain transfer agent, preferably acetaldehyde, to the AVE and/or by controlling the reaction temperature and/or the amount of initiator.

* The "average residence time" of monomer molecules spent between inlet and outlet in the process is mathematically equal to 1/feeding rate of reactants in vol./time X Vol of Reactor.

In system 100, the liquified solvent monomer (methyl vinyl ether) is pressurized and fed at a constant flow to the reactor system 400 which may consist of a Continuous Stirred Tank Reactor (CSTR) or of two or more CSTRs in series, or an agitated back mixed reactor, or a plug flow tubular reactor, which is maintained at a constant temperature between about 40° C. to 120° C., preferably 60–90° C. Molten maleic anhydride (MAN), in 200, also pressurized, is fed and mixed well with the solvent monomer at a constant rate in the reactor; where, with a constant addition of an initiator having a half-life of 2 to 10 hours, e.g. lauroyl or decanoyl peroxide (or any other radical initiator) from 300, can rapidly react to form a slurry of the desired solid product (10–40% by weight) in the excess of liquid solvent monomer. In this continuous process, the molar ratio of AVE/MAN in the reactor is about 25:1 to 5:1, preferably about 12:1 to 7:1.

With the maintenance of a constant volume in the reactor, the slurry mixture is continually withdrawn and fed to a low pressure drier system 500; where, with the addition of heat, the excess solvent monomer is vaporized and the solid product is separated and removed. The recovered monomer is then cooled and re-pressurized in the recovery system 800. Following compositional adjustments, the monomer solvent is returned to the solvent feed system 100.

AVE may be separated from polymer by continuous drying or by filtration, and recycled after continuous purification e.g. by continuous distillation, washing with water of pH >9, and drying.

While the invention has been described with particular reference to certain embodiments thereof, it will be understood that changes and modifications may be made which are within the skill of the art. Accordingly, it is intended to be bound only by the following claims, in which:

What is claimed is:

1. A continuous, solvent-free process for obtaining solvent-free, fine white powders of high molecular weight alternating copolymers of maleic anhydride and a $C_1$–$C_4$ alkyl vinyl ether, without odor or taste, having the molecular structure $(A-B)_n$, where A is maleic anhydride, B is an alkyl vinyl ether and n is an integer indicative of the molecular weight of the copolymer, which comprises feeding alkyl vinyl ether as reactant and solvent in excess over the desired 1:1 mole ratio of A:B in the copolymer, molten maleic anhydride and a free radical initiator, continuously at a predetermined feeding rate into a reactor heated to a reaction temperature of about 50° to 100° C., charging the reactor and withdrawing reaction product, residual alkyl vinyl ether and initiator from the reactor at the same rate as the feed rate of reactants into the reactor, simultaneously, thereby maintaining a constant volume in the reactor, stripping residual alkyl vinyl ether from the reaction product, drying the copolymer there-obtained of any remaining traces of alkyl vinyl ether, and recycling recovered alkyl vinyl ether back into reactor as reactant and solvent, wherein the mole ratio of alkyl vinyl ether to molten maleic anhydride is about 25:1 to 5:1, wherein the initiator concentration is 0.01 to 0.2% based on copolymer, wherein the % copolymer solids in the reaction product removed from the polymerization reactor is about 10 to 40%.

2. A continuous, solvent-free process according to claim 1 wherein said alkyl vinyl ether is methyl vinyl ether.

3. A continuous, solvent-free process according to claim 1 wherein said mole ratio is 12:1 to 7:1.

4. A continuous, solvent-free process according to claim 1 wherein the drying step is carried out at 40° to 100° C. under vacuum or atmospheric pressure.

5. A continuous, solvent-free process according to claim 1 wherein the average residence time of reactants in the reactor during the process is about 0.5 to 5 hours.

* * * * *